H. B. DIPWORTH.
VEHICLE SPRING.
APPLICATION FILED MAR. 21, 1921.
1,422,755.
Patented July 11, 1922.
2 SHEETS—SHEET 1.
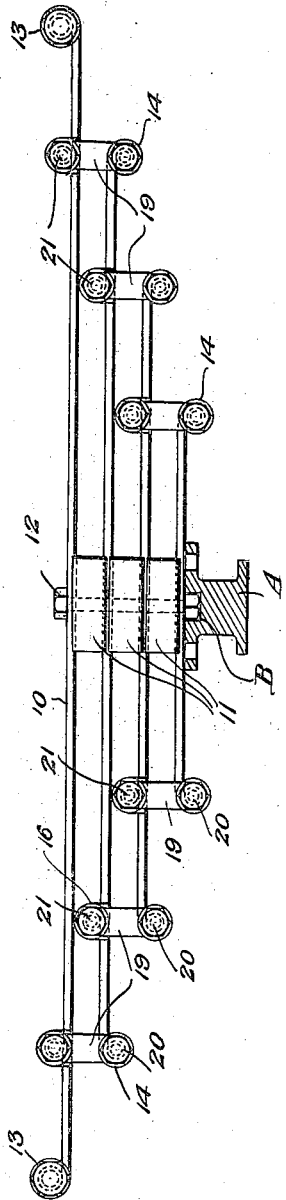
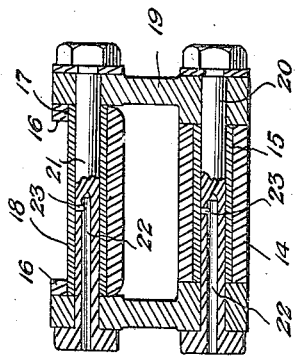
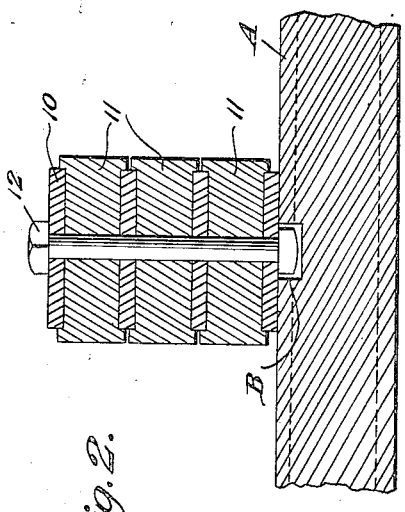
Hermann B. Dipworth
INVENTOR
BY Victor J. Evans
ATTORNEY
WITNESS:
C. Nye Fraser Jr.

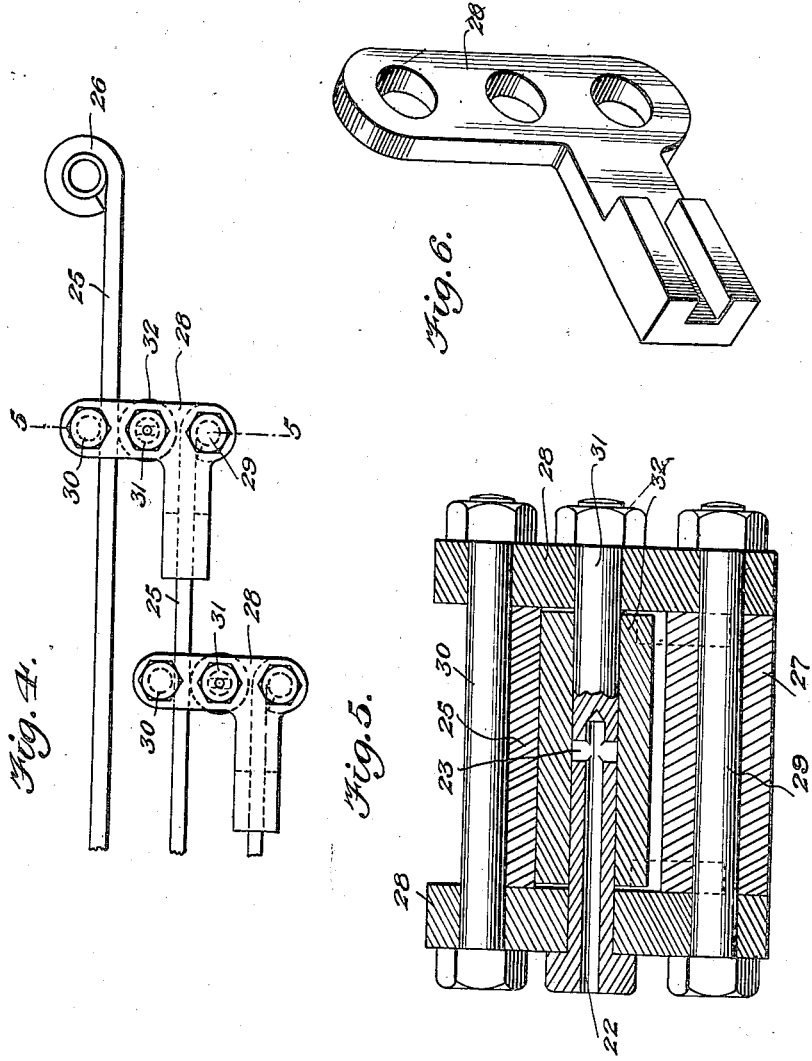

UNITED STATES PATENT OFFICE.

HERMANN B. DIPWORTH, OF SAGINAW, MICHIGAN.

VEHICLE SPRING.

1,422,755.　　　　Specification of Letters Patent.　　Patented July 11, 1922.

Application filed March 21, 1921. Serial No. 454,021.

*To all whom it may concern:*

Be it known that I, HERMANN B. DIP-WORTH, a citizen of the United States, residing at Saginaw, in the county of Saginaw and State of Michigan, have invented new and useful Improvements in Vehicle Springs, of which the following is a specification.

This invention relates to springs adapted for use upon vehicles of various kinds, and has for its object the provision of a novel leaf spring construction, so formed and arranged as to provide very great resilience and easy riding qualities without decreasing the strength and durability of the construction.

An important and more specific object is the provision of a spring of this character formed of a plurality of leaves of progressively increasing length spaced apart at their centers, the successive ends of the leaves being flexibly connected with the next adjacent leaves.

An additional object is the provision of a spring of this character which will be simple and inexpensive in construction, highly efficient in use, durable in service and a general improvement in the art.

With the above and other objects and advantages in view, the invention consists in the details of construction to be hereinafter more fully described and claimed, and illustrated in the accompanying drawings, in which:—

Figure 1 is a side elevation of one form of my springs.

Figure 2 is a cross sectional view taken through the center thereof.

Figure 3 is a cross sectional view taken through one of the hangers.

Figure 4 is a fragmentary elevation of a modified form of spring.

Figure 5 is a cross sectional view therethrough.

Figure 6 is a detail perspective view of one of the hangers.

Referring more particularly to the drawings and especially to Figures 1, 2 and 3, I have shown my spring as comprising a plurality of leaves 10 of successively increasing length but of similar construction in other respects. As shown the longest leaf is the uppermost one, though it is to be understood that this relation might be inverted if preferred. The letter A designates an axle of the vehicle upon which the spring is to be mounted and it should be understood that the size of the leaves in every respect and their number must depend entirely upon the character of the vehicle upon which the springs are to be used, with special regard to the weight of the vehicle. My spring structure is secured upon the axle A by any suitable means as for instance by use of clips such as are commonly used and such securing means is not illustrated in the drawings as forming no part of the present invention. The leaves are all arranged one above another as clearly shown and are spaced apart by means of a plurality of spacing blocks 11 which have their confronting faces recessed for conforming reception of the successive leaves. The numeral 12 designates a bolt which pass through all the leaves and through all the spacing blocks as clearly shown and the axle A is formed in its upper surface with a recess B receiving the lower end of the bolt.

The ends of the uppermost or of the longest leaf are formed with knuckles 13 by means of which the spring structure may be mounted in any suitable hangers not shown. The outer ends of the other leaves are all formed with similar knuckles 14 within which are located suitable bushings 15.

At a point spaced from each end, each leaf is formed with upwardly extending ears 16 formed with holes 17 within which are engaged the ends of bushings 18.

Each end of each leaf is connected with the leaf next above it by means of hangers 19 pivotally connected with the knuckles 14 by means of bolts 20 which pass through the lower ends of the hangers and through the bushings 15. The upper ends of these hangers 19 are connected with the ears 16 by means of bolts 21 which pass through the upper ends of the hangers and through the bushings 18. The bolts 20 and 21 are provided with the usual longitudinal grease openings 22 which lead into transverse openings 23 for lubricating the area of contact of the bolts with the bushings.

In the form of the device illustrated in Figures 4 and 5 the numeral 25 designates the leaves the uppermost one of which is provided at its free end with a bush knuckle 26 for connection with any suitable hanger for connecting the spring with a frame to be supported. The ends of all the leaves other than the uppermost one are formed with knuckles 27 at the sides of which are disposed angularly shaped hangers 28 pivotally mounted by means of bolts 29 passing through the knuckle 27. The upper ends of these hangers 28 are connected by means of bolts 30 which extend across and contact with the leaf next above as clearly shown in Figure 5. Extending transversely at substantially the center of each pair of hangers 28 is a bolt 31 upon which is journaled a roller 32 bearing against the underside of the leaf next above.

In the second form of the device it will be seen that the rollers 32 will effectively operate to reduce friction and allow even greater freedom of movement than is possible with the first described form. It is however to be noted that both forms of the invention provide extremely resilient and easy riding springs which, being spaced part, are incapable of squeaking and which will at all times retain their individuality as there is no possibility of their rusting together such as frequently happens in the use of the ordinary springs.

From the foregoing description and a study of the drawings it will be apparent that I have thus provided an extremly simple and efficient spring construction which will be inexpensive, which may be easily installed, and which will greatly increase the comfort of the vehicle upon which they are used.

While I have shown and described the preferred embodiment of the invention, it is of course to be readily understood that I reserve the right to make such changes in the form, construction and arrangement of parts as will not depart from the spirit of the invention or the scope of the subjoined claims.

Having thus described my invention, I claim—

1. A vehicle spring comprising the combination with a vehicle axle and frame, of a plurality of spaced superposed leaves of progressively increasing length, the lower or shorter leaves being secured upon the axle and the uppermost leaf being provided at its ends with knuckles adapted for connection with hangers associated with the vehicle frame, hangers pivotally connected with the ends of all the leaves and extending upwardly, bolts extending through the upper portions of the respective hangers and engaging against the upper sides of the leaves next above, and a roller journaled intermediate the ends of each hanger and engaging against the underside of the leaves next above.

2. A vehicle spring comprising the combination with a vehicle axle and frame, of a plurality of spaced superposed leaves of progressively increasing length, the lower or shorter leaves being secured upon the axle and the uppermost leaf being provided at its ends with knuckles adapted for connection with hangers associated with the vehicle frame, hangers pivotally connected with the ends of all the leaves and extending upwardly, bolts extending through the upper portions of the respective hangers and engaging against the upper sides of the leaves next above, and a roller journaled intermediate the ends of each hanger and engaging against the underside of the leaves next above, the spindle of said roller being formed with a longitudinal bore communicating with transverse bores leading to the inner periphery of the roller whereby to provide lubricating means.

In testimony whereof I affix my signature.

HERMANN B DIPWORTH.